April 12, 1955  H. D. NORTH, JR., ET AL  2,706,133
NOZZLE SUPPORT ATTACHMENT FOR SPRAY BOOM
Filed April 25, 1952
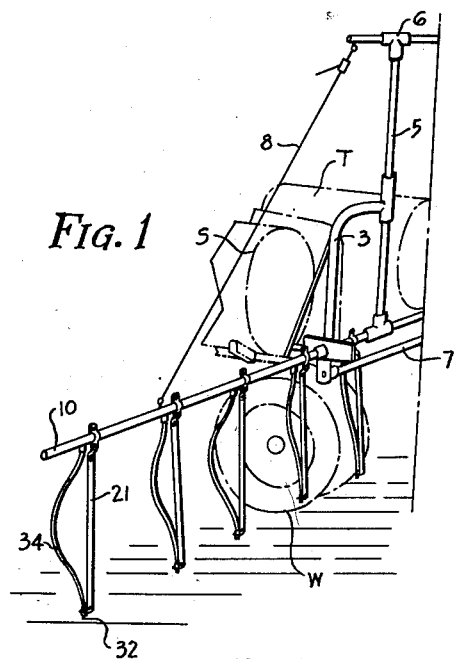
Fig. 1
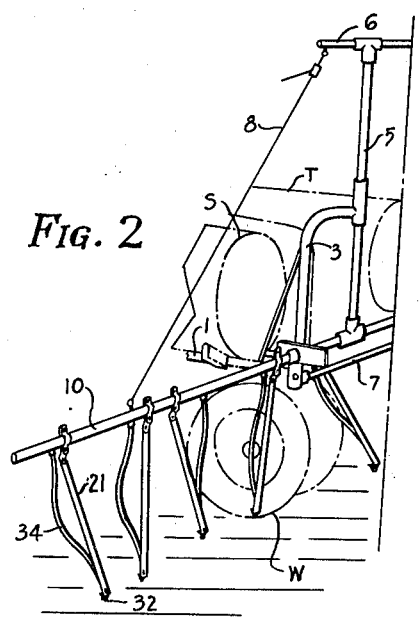
Fig. 2
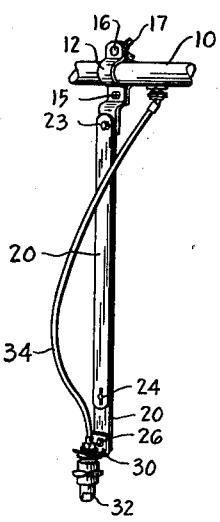
Fig. 3
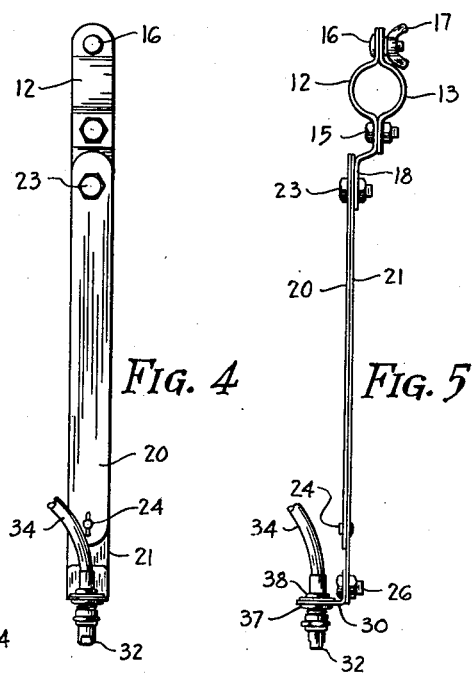
Fig. 4   Fig. 5
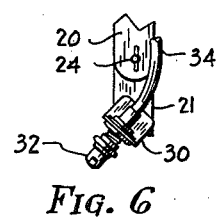
Fig. 6
INVENTORS
HAROLD D. NORTH JR.
BY & DEAN O. PHILLIPS
ATTY

United States Patent Office 2,706,133
Patented Apr. 12, 1955

2,706,133

NOZZLE SUPPORT ATTACHMENT FOR SPRAY BOOM

Harold D. North, Jr., Shaker Heights, and Dean O. Phillips, Cleveland, Ohio, assignors to The Engine Parts Manufacturing Company, Cleveland, Ohio, a corporation of Ohio Application April 25, 1952, Serial No. 284,404

2 Claims. (Cl. 299—39)

This invention relates to spraying of rows of plants, from a few inches to a foot or two in height, by the use of power-driven and power-actuated spraying devices.

In practice, such spraying is preferably accomplished by directing fine fog-like spray at the plants in the rows simultaneously from opposite sides of the rows, thus fully covering the individual plants of a number of rows simultaneously.

In the present construction, a horizontal boom bridging over several parallel rows is mounted on a tractor or like vehicle carrying a supply of liquid spray and having means for generating pumping pressure to cause the liquid to flow outwardly along the boom to the nozzles.

The present invention is specifically directed to the arrangements for mounting the nozzles so that they may be adjusted for different widths of spacing of the rows, and for different heights of plants, and for changing the spacing between pairs of nozzles.

Further objects include so mounting of the nozzles and connections as to provide resiliency to avoid breaking the nozzles or bending or injuring the boom or nozzle-carrying members.

To this end we provide a boom and nozzle-carrying means capable of being cheaply manufactured; of a simple construction and of readily available materials; preferably of minimum weight and ease of attachment for use, and adjustable to meet varying conditions in the field.

Such a boom construction, adapted for mounting upon a vehicle supporting tanks carrying the spray liquid, is illustrated and described in an application, Ser. No. 11,226, filed February 26, 1948, for "Spraying Device for Attachment to Tractors."

Any suitable vehicle may be used, but a widespread practice is to fit such apparatus to standard farm tractors.

In the drawings,

Fig. 1 is a perspective view of a portion of such a boom, illustrating the wheels of a farm tractor and spray liquid tanks, and showing our nozzle-mounting devices attached to the boom;

Fig. 2 is a similar view, showing the nozzle-carrying members in different positions;

Fig. 3 is a perspective view on a somewhat enlarged scale, showing the nozzle-carrying member attached to the boom tube;

Fig. 4 is a slightly further enlarged elevation of the nozzle carrier and nozzle connected thereto;

Fig. 5 is a side elevation of the same; and

Fig. 6 is a fragmentary view showing the nozzle in a different angular position.

Referring to the drawings by the use of reference characters, W indicates in broken lines the front or steering wheels of a tractor. S and T designate the liquid storage tanks carried by the tractor, and from which the liquid is supplied to the boom in any suitable manner.

1 indicates a portion of the frame of the tractor in broken lines, to which are attached supporting elements for the boom parts, shown as comprising upright members 3 and 5 rising above the tractor frame and connected above and below by cross members indicated at 6 and 7.

A bracing cable 8 is shown as supporting the boom tube or pipe 10 which extends transversely across the front of the tractor and for several feet or yards each way therefrom.

In the construction disclosed in the application referred to, the boom comprises a tube or pipe 10 which may be extended by adding sections, as desired. Within this pipe 10 is a smaller tube, not here shown, carrying the spray fluid, and at intervals downwardly extending connections may be connected to the nozzles, as will appear.

Our resilient nozzle supporting members preferably comprise clamping elements 12 and 13 embracing the pipe 10 and secured above and below the pipe by bolts 15 and 16, the latter bolt being provided with a convenient thumb nut 17. By loosening this nut the clamps may be slid longitudinally of the pipe 10, and tightened in any desired position.

The clamping element 11 extends downwardly below the bolt 15, as indicated at 18. Resilient flat strip metal members 20 and 21 are pivotally secured to the member 18 by a bolt 23 which may be loosened and tightened to permit swinging the arms, and then holding them in different downwardly projecting angular positions, such as indicated in Fig. 2. The strip 20 is preferably shorter than the strip 21 and is provided near its lower end with a short, longitudinally extending slot through which a rivet 24 extends. This rivet is preferably fixed to the strap 21 and has an enlarged head on the outer side of the strap 20 while the shank of the rivet may slide in the slot. Thus the straps are held in close engagement while being mutually reinforced and may readily bend together.

The lower end of the member 21 is provided with an opening for receiving a bolt 26 which passes through an angle bracket 30 projecting at right angles to the supporting arm, and having an opening through which the shank of the nozzle 32 may extend, the upper portion being connected to the tube 30 leading from the supply tube inside of the tank 10, as indicated particularly in Fig. 3.

Suitable nuts 37 and 38 may clamp the shank of the nozzle 32 to the bracket 30, and the tube 34 is of such length and flexibility as to permit the nozzle to be turned at an angle to the depending arm, as indicated in Fig. 6. It may be clamped in any given angular position by the bolt 26.

Any suitable number of these nozzle supports may be positioned along the boom tube member. They may be arranged in pairs to spray from opposite sides onto the same row. They may depend at different angles, and the nozzles may be directed at further angular relationship to suit the needs and accomplish the foregoing objects.

The clamping members 12 and 13 and the strips 20 and 21 are preferably all made of flat resilient strip material. To avoid excessive weight of all of these parts it is preferable to use thin strips and to stiffen the depending arm by the strip 20. As indicated, its slidable rivet connection at the lower end permits both the strips 20 and 21 to flex together while attaining the needed stiffness, and the assurance of maintaining the position desired for the nozzles.

The economy and simplicity of manufacture and use are apparent from the foregoing. Various minor modifications may be made without departing from the spirit of the invention, as defined in the appended claims.

Having thus described our invention, what we claim is:

1. A nozzle support for use in a spraying device and comprising a boom carrying a plurality of nozzles, a support consisting of thin flat metal strips one portion of which comprises a clamping boom-embracing element and another portion of which comprises a depending arm extending downwardly below the boom, a pivotal clamping connection between the arm and the boom clamp arranged to permit the arm to be held angular in different angular positions in relation to the boom, one of said arm strap portions having a slot and the other an opening through which a securing member extends for holding the straps tightly together while permitting slight relative longitudinal movement when the straps are bent, and means for supporting the nozzle at the lower end of said support.

2. The nozzle support described in claim 1 in which the means supporting the nozzle comprises a thin flat strip having a forwardly extending portion through which the nozzle projects, and having means for securing the nozzle thereto, said nozzle support and the lower end of the strap each having registering openings, and a clamping bolt passing said openings for holding the support and nozzle in different angular positions in relation to the arm.

References Cited in the file of this patent

UNITED STATES PATENTS

| | | |
|---|---|---|
| 493,719 | Henderson | Mar. 21, 1893 |
| 1,258,193 | Cook | Mar. 5, 1918 |
| 1,678,061 | Fowler et al. | July 24, 1928 |

FOREIGN PATENTS

| | | |
|---|---|---|
| 557,785 | France | May 11, 1923 |